May 24, 1966  A. D. F. MONCRIEFF  3,252,358

INDEXING MECHANISM

Original Filed May 27, 1963

INVENTOR.
Alexander D. F. Moncrieff
BY
Harness, Dickey & Pierce
ATTORNEYS.

United States Patent Office 3,252,358
Patented May 24, 1966

3,252,358
INDEXING MECHANISM
Alexander D. F. Moncrieff, Bloomfield Hills, Mich., assignor to Michigan Tool Company, Detroit, Mich., a corporation of Delaware
Original application May 27, 1963, Ser. No. 283,229. Divided and this application Mar. 22, 1965, Ser. No. 448,227
1 Claim. (Cl. 77—64)

This is a division of application Serial No. 283,229, filed May 27, 1963, and now abandoned.

This invention relates to indexing mechanisms. In particular, the invention is concerned with highly accurate indexing mechanisms of the type having upper and lower circular plates with facing annular rows of interengaging teeth, such as are shown in the indexing fixture of Schabot Patent No. 2,921,487.

It is an object of the invention to provide a novel and improved construction for such indexing fixtures which greatly reduces the labor involved in completing a highly accurate fixture, and in which accuracy of meshing is insured without the necessity of lapping large areas of the tooth surfaces.

It is another object to provide an improved indexing fixture of the above character which reduces the likelihood of dirt or other foreign matter interfering with the operation of the unit.

Other objects, features, and advantages of the present invention will become apparent from the subsequent description, taken in conjunction with the accompanying drawings, in which.

Briefly, the invention comprises a construction of the teeth or serrations in an indexing fixture such as that shown in the above-mentioned Schabot patent, which provides point contact rather than surface contact between the interengaging teeth when the upper plate engages the lower plate. By virtue of this point contact, high indexing accuracy is obtained in all rotative positions of the upper plate, while the need for accurately lapping the many tooth blank surfaces is largely eliminated, since the major portions of the tooth blanks are not in contact with each other.

Figure 1:
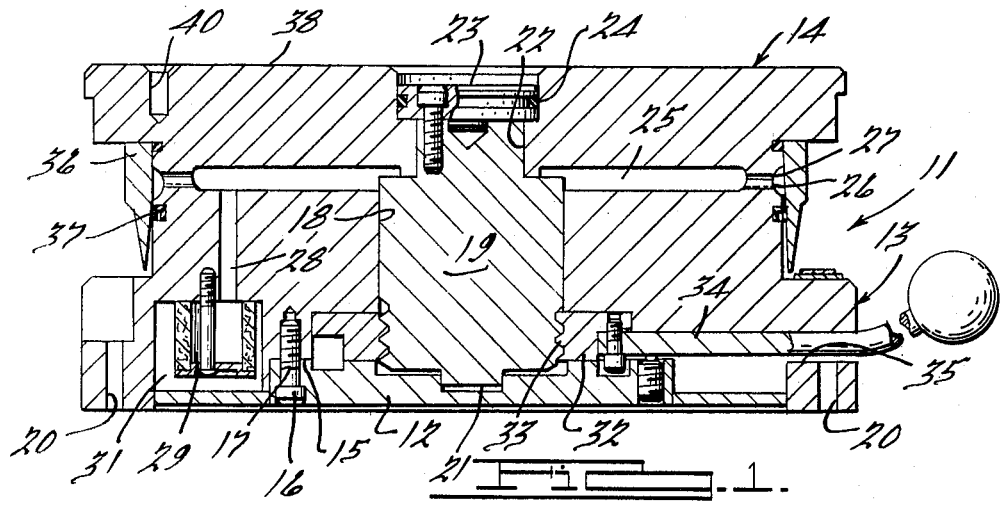
FIGURE 1 is a cross-sectional view in elevation showing an indexing fixture incorporating the principles of the invention.
Figure 2:
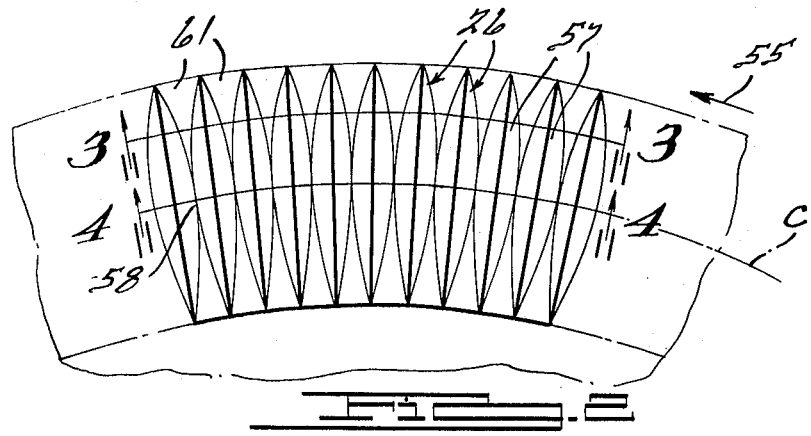
FIGURE 2 is a top plan view of a portion of the lower plate showing the contours of the teeth.
Figure 3:
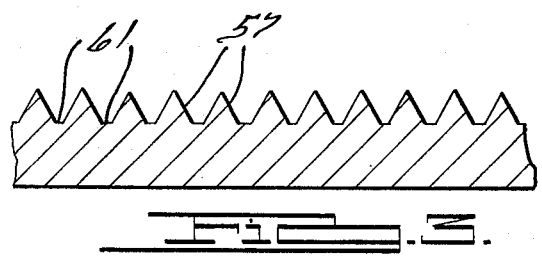
FIGURE 3 is a cross-sectional view in elevation taken along the line 3—3 of FIGURE 2 and showing the contours of the teeth.
Figure 4:
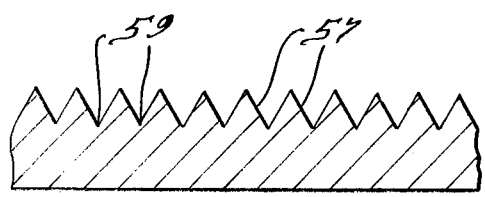
FIGURE 4 is a cross-sectional view in elevation taken along the line 4—4 of FIGURE 2 and showing the tooth flank contour at the center of the teeth.

Referring more particularly to the drawings, the indexing fixture is indicated generally at 11 in FIGURE 1 and comprises a circular and generally flat cover 12 which is mounted on lower plate generally indicated at 13, an upper plate generally indicated at 14 being mounted above plate 13. Lower plate 13 is wider than cover 12, being connected thereto at interengaging surfaces 15. A bolt 16 extends through an enlarged aperture 17 in cover 12 and is threaded into the underside of lower plate 13. Lower plate 13 is provided with apertures 20 to secure the indexing fixture to its support if required.

A central bore 18 is provided in lower plate 13, and a post 19 is slidably and nonrotatably mounted in bore 18 by virtue of a key-and-slot connection 21 between the lower end of post 19 and base 12. A central bore 22 is provided in upper plate 14, and post 19 extends therethrough, being secured to upper plate 14 by a cap 23 having a gasket 24 to prevent foreign matter from entering the space 25 between the plates. This space is created by annular recessed portions in the facing surfaces of the plates, these portions being surrounded by annular bosses or raised portions with rows of teeth 26 and 27, respectively, on plates 13 and 14. A passageway 28 is provided in lower plate 13 for permitting air to enter space 25, air entering the passageway flowing through a filter 29 mounted in a space 31 within lower plate 13.

The means for raising and lowering upper plate 14 with respect to lower plate 13 comprises a nut 32 rotatably mounted between base 12 and lower plate 13 and having internal threads which mesh with external threads on the lower end of post 19, the threads being indicated at 33. A handle 34 is secured to nut 32 and extends through a slot 35 in lower plate 13. Rotating of handle 34 in a horizontal plane will thus raise or lower post 19, causing teeth 27 to become disengaged from or engaged with teeth 26.

A skirt 36 is secured to upper plate 14 outwardly of teeth 27 and extends downwardly, surrounding the upper portion of lower plate 13. Skirt 36 may be provided with scribe marks (not shown) for cooperation with index marks on lower plate 13 when upper plate 14 is being angularly adjusted. A seal 37 is mounted in an annular recess in plate 13 and engages the surface of skirt 36. The upper surface 38 of upper plate 14 is flat and is provided with apertures 40 for securing thereto the work or other object (not shown) to be indexed.

Sets of teeth 26 and 27 are of like shape and diameter, facing each other and being movable into interengaging position to lock upper plate 14 in an indexed position. The teeth in each set are equidistantly spaced, and the number of teeth is equal to the desired angular spacing between index positions. In a typical example, 360 teeth may be provided in each set 26 and 27, so that upper plate 14 may be indexed at 1° intervals.

In operation of unit 14, handle 34 will be rotated to raise plate 14, after which the plate may be rotated into its desired position and handle 34 again rotated to permit teeth 27 to become interengaged with teeth 26. Plate 14 will be supported solely by teeth 26, and the line contact between teeth 26 and 27 will insure accuracy despite the possibility of minor surface variations on the portions of teeth 26 and 27 not in contact. Because of the clearance spaces between the teeth, there will be less likelihood of dirt or other foreign matter interfering with the acurracy of the unit. There will also be no "heel and toe" interference between teeth 26 and 27, a possibility which exists with teeth of the Schabot type, because the teeth will only be engaged at their central portions.

While it will be apparent that the preferred embodiment of the invention disclosed is well calculated to fulfill the objects above stated, it will be appreciated that the invention is susceptible to modification, variation and change without departing from the proper scope or fair meaning of the subjoined claim.

What is claimed is:

In an indexing fixture of the type having relatively rotatable lower and upper plates, annular sets of interengageable teeth on said plates, each set of teeth being engageable in troughs between teeth of the other set, the teeth in each set extending generally radially and having convex flanks tapering toward the inner and outer teeth ends, whereby said teeth have point contact with each other when in their interengaged position.

References Cited by the Examiner

UNITED STATES PATENTS

| 2,410,913 | 11/1946 | Wildhaber | 90—9 |
| 2,921,487 | 1/1960 | Schabot | 77—64 |

WILLIAM W. DYER, JR., *Primary Examiner.*

FRANCIS S. HUSAR, *Examiner.*